June 2, 1953 — F. G. BOUCHER — 2,640,271
WELL LOGGING METHOD AND APPARATUS
Filed April 27, 1948 — 5 Sheets-Sheet 2

Frank G. Boucher Inventor
By W. O. J. Heilman Attorney

June 2, 1953     F. G. BOUCHER     2,640,271
WELL LOGGING METHOD AND APPARATUS
Filed April 27, 1948     5 Sheets-Sheet 3

Frank G. Boucher Inventor
By W. O. Heilman Attorney

June 2, 1953  F. G. BOUCHER  2,640,271
WELL LOGGING METHOD AND APPARATUS
Filed April 27, 1948  5 Sheets-Sheet 4

Frank G. Boucher Inventor
By W. O. Teilman Attorney

June 2, 1953 F. G. BOUCHER 2,640,271
WELL LOGGING METHOD AND APPARATUS
Filed April 27, 1948 5 Sheets-Sheet 5

Frank G. Boucher Inventor
By W.O.T Kilman Attorney

Patented June 2, 1953

2,640,271

UNITED STATES PATENT OFFICE 2,640,271

WELL LOGGING METHOD AND APPARATUS

Frank G. Boucher, Tulsa, Okla., assignor to Standard Oil Development Company, a corporation of Delaware Application April 27, 1948, Serial No. 23,490

8 Claims. (Cl. 33—174)

The present invention is directed to a method and apparatus for logging bore holes. In particular the present invention is a method and apparatus by means of which the orientation, dip and strike, of strata traversed by a bore hole may be determined.

At the present time there is no means known for establishing the presence of oil deposits, other than to dig test wells in the earth to determine whether or not oil may be present at a particular point in the earth. While methods are available to indicate the possibility of obtaining oil from a particular locality, it is nevertheless necessary to actually drill for the oil in order to ascertain whether or not oil is actually present. The drilling in the earth of a suitable bore hole, or well, to test for oil is an exceedingly expensive procedure. Consequently, to obtain the most benefit from such drilling operation, every effort is made to obtain as much information as possible from the drilling of each well. This is done in order to eliminate the possibility of overlooking possible producing strata in the well while it is being bored, and also to obtain information as to the structure of the earth, which will lead to establishing the presence of oil in an adjacent locality or more deeply in the well being drilled. Consequently, extensive methods have been developed for examining a bore hole to determine every particle of information that can be obtained as to the nature of strata through which the well passes. These methods are called "well logging methods," and generally comprise methods for preparing continuous plots of the physical or chemical characteristics of the well along its entire length. It is the primary purpose of this invention to provide a new well logging method for determining information from a bore hole as to the relative hardness and the exact orientation of strata adjacent the bore hole.

The orientation of a stratum is ordinarily indicated by angles of "dip" and the direction of "strike." The angle of dip is defined to be the angle of inclination of the plane of stratification with a horizontal plane, while the direction of strike is defined to be the direction of the line of intersection of the plane of stratification and a horizontal plane. Having obtained the dip and strike of a particular stratum, it is apparent, therefore, that the exact orientation of the stratum has been established. This information is useful in predicting the possibility of obtaining oil in the bore hole tested, in establishing the general geologic nature of the adjacent earth, and for the indication of possible nearby oil deposits.

It has been discovered that the dip and strike of strata through which a bore hole passes may be determined by correlating information readily obtainable by suitable apparatus. A basic principle on which the operation of this apparatus works is that the diameter of a bore hole varies somewhat proportionately to the hardness of the strata through which the bore hole passes. Thus as the bore hole passes through an extremely hard formation, the diameter of the bore hole will be somewhat less than it is in passing through a soft, or porous formation. The difference in the diameter of the bore hole, in relation to different types of strata is due to several factors. One factor is that the drilling tool will tend to break off, or cut, a somewhat larger hole in a soft formation than in a hard formation. Another factor is that due to the conventional continued circulation of drilling mud, or a similar fluid during drilling operations, preferential erosion of softer strata will occur. In any event it is now established that the principle indicated above is correct.

The basic principle, therefore, that the diameter of a bore hole at a particular point is a function of the hardness of the strata at that point, provides a suitable means for obtaining the relative hardness and the dip and strike of strata in the bore hole. Thus if a measuring device is passed through the bore hole to accurately determine the diameter of the bore hole along the length of the bore hole, it is possible to identify the harder and softer strata through which the bore hole passes. If this same type of measuring device is modified so as to maintain the device in essentially a central position, at all times, and if a plurality of measuring devices arranged in a horizontal plane are used to measure the variation in the distance of the bore hole from the central part of the bore hole, it is possible to determine the inclination of hard or soft strata at particular points in the bore hole. For example, if a measuring device is imagined having two calipers, the contact points of these calipers being in a horizontal plane, and if it is assumed the measuring device is maintained at the center of a bore hole, as it is moved downwardly, the movement inwardly of one caliper, due to a decrease in the diameter of the bore hole before the other caliper moves inwardly will indicate that the plane of stratification is inclined so that the point of contact of the first caliper is above that of the second caliper. It is apparent that in addition to this information it is necessary to know the exact orientation of the calipers at the time a particular measurement is made; and the vertical difference in height between the inward movement of the calipers. In other words in the example just given, if the azimuthal direction of the calipers be known, then the angle the particular stratum deviates from horizontal in this direction will be the angle having a tangent equal to the vertical distance between contact of each caliper with the particular stratum divided by the diameter of the bore hole. It is apparent that this information will only give the inclination of the stratum in the azimuthal direction the two calipers are oriented in, so that it is necessary to employ three or more calipers to actually ascertain the dip and strike of the stratum. However, the principles set forth above are the basic principles involved which will permit a full understanding of the apparatus of this invention.

In accordance with these principles, therefore, a preferred embodiment of this invention comprises the following components: Three or more, and preferably four, caliper measuring devices are provided, together with centering and guiding means to maintain the apparatus in substantially the center of a bore hole and to maintain the apparatus in alignment with the bore hole. As an integral part of this apparatus an orienting device is provided which will determine the azimuthal orientation of the apparatus and also an inclination detector is incorporated to determine the inclination of the apparatus from the vertical in the event the bore hole is not vertical. This entire apparatus is then lowered down a bore hole employing a cable together with a suitable measuring device to determine the depth of the apparatus in the bore hole. The cable also includes electrical conductors connected to the calipers, an orienting device, and an inclination device so as to permit recording on the surface of the earth of all necessary information to precisely indicate the dip and strike of strata traversing the bore hole.

In the accompanying drawings a preferred form of the apparatus of this invention is indicated. It is apparent that this apparatus is adaptable to many modifications and refinements. It is to be understood, therefore, that the scope of the present invention is not to be limited to the embodiment illustrated.

In these drawings:

Figures 1 and 2 diagrammatically indicate the entire apparatus; Figure 2 comprising the lower continuation of Figure 1. These figures generally indicate the arrangement of the different components and particularly show suitable centering and caliper devices.

Figures 4, 5, 6, and 7 show a suitable inclinometer for use in the apparatus of Figures 1 and 2, Figure 4 being an elevation, partly in section, of the device.

And finally.

Figures 1, 2:
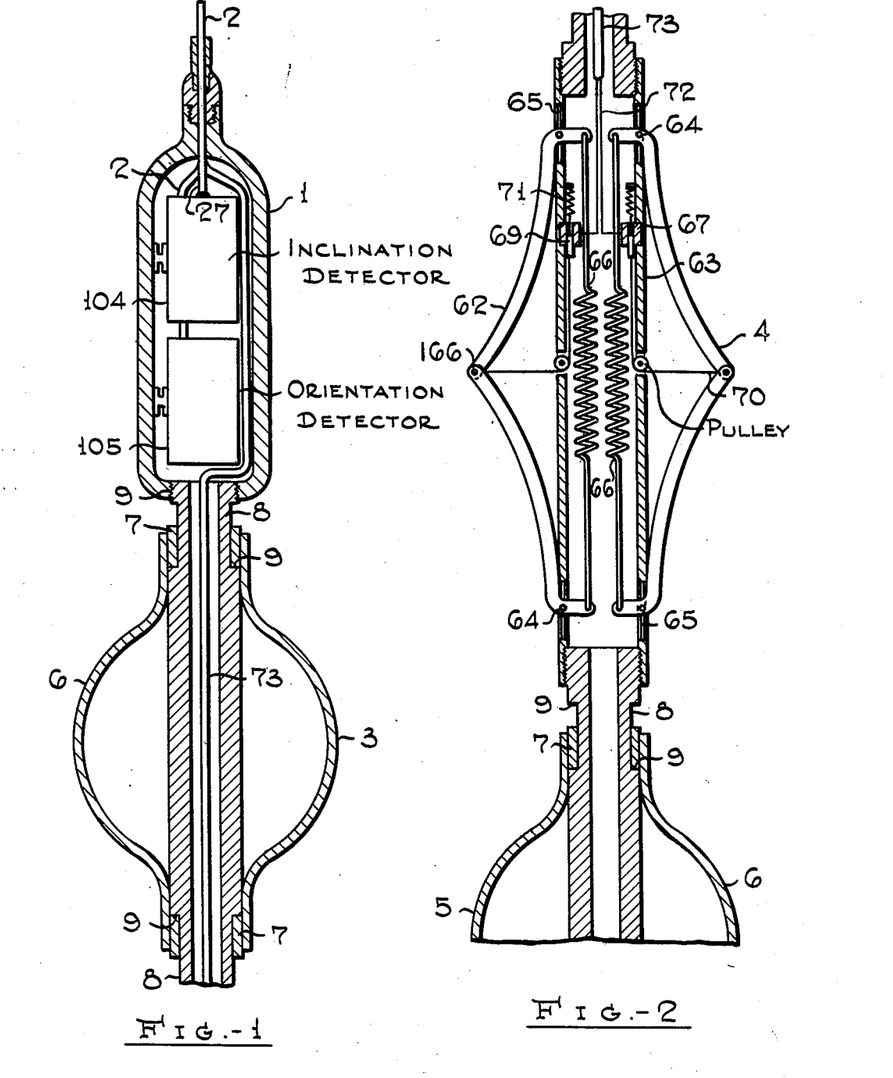

Referring now to Figures 1 and 2, the general nature of the entire apparatus of this invention is illustrated. The apparatus comprises the casing 1, containing an orientation detector and an inclination detector, the centering device 3, the measuring device 4, and the centering device 5. All these units are suitably sustained in a bore hole by means of cable 2, which includes conductors to the different parts of the apparatus as will be described. The centering devices 3 and 5, which are similar to each other, the parts of which are identified by similar numerals, serve to maintain the entire apparatus in essentially a central position in the bore hole. This is accomplished by virtue of the spring elements 6 which contact the sides of the bore hole. While the drawing simply illustrates two leaf springs, 6, on each of the two centering devices, it is preferred to use at least four leaf springs for this purpose. These springs are fixed to bearings 7 which slidably encircle a shaft 8 provided with shoulders 9. Consequently, as the apparatus is lowered down a bore hole, contact of the leaf springs 6 with the bore hole causes an inward compression of the spring members forcing the bearings 7 along the shaft 8 within the limits provided by the shoulders 9. By the nature of these centering devices, a reduced cross section or an expanded cross section in the diameter of the bore hole will equally compress or equally relieve each of the spring members 6 so as to maintain the entire apparatus, at all times, essentially in the center of the bore hole and in alignment with the bore hole. The spring centering devices also perform the function of minimizing rotation of the apparatus in the bore hole as the apparatus is lowered down the bore hole. Furthermore, the tension of the springs 6, against the sides of the bore hole is sufficiently great at all times so that the position of the apparatus in the bore hole will not be affected by contact of the calipers 62 with the bore hole. Thus, for example, contact of only one of several calipers against an isolated projection of the bore hole will not cause the apparatus to move, preventing the receipt of false signals from the other calipers. It is apparent that each of the functions of the centering devices indicated is necessary in order to obtain proper information from the orientation detector, the inclination detector, and the calipers. The bore hole diameter measuring devices employed in the apparatus of Figures 1 and 2 comprise a plurality of calipers, generally indicated by the numeral 4. Again while two of the caliper arrangements are illustrated in the drawing, it is preferred that four be employed although three would be sufficient and any greater number could be used. Each of the calipers comprises two arms 62 which are pivoted on the casing 63 by means of pins 64. These pins are arranged to move vertically in slots 65 provided in the casing 63. Each of the calipers is biased by the springs 66 so as to urge the outermost portion of the calipers against the bore hole at all times. The two arms of each caliper are pinned at the outermost extensions of the caliper by a suitable pin 166, adapted to permit the calipers to move freely inwardly, or outwardly. It is convenient to compose the casing 63 of ordinary pipe, providing suitable slots in the pipe to accommodate the arms of the calipers and to provide the necessary grooves for the pins 64 to slide in. Consequently, as the calipers are moved along the bore hole, the calipers will each move inwardly and outwardly as the calipers encounter irregularities in the bore hole. Due to the centering devices 3 and 5, provided on the apparatus, any projection or depression encountered by one of the calipers will not affect the centering of the apparatus, and will not affect the movement of any of the other calipers. Thus, each of the four calipers provided, is adapted to accurately move inwardly or outwardly as the bore hole varies in the line along which the particular caliper moves. It is preferred that the arms of the caliper have a curved design, as illustrated, in order to magnify the movements of the caliper for slight changes in the diameter of the well.

As illustrated, the movements of the calipers may be caused to vary the reactance of a coil so as to transmit through supporting cable 2 information as to the position of each caliper. For this purpose solenoid coils 67 are provided adjacent each caliper, supported to the casing 63 by suitable clamps 68. The armature of these solenoids, identified by numeral 69, is adapted to slide inwardly, or outwardly in the coil, thereby changing the electrical characteristics of the coil. One end of the armature is firmly fixed to a rod, or wire 70, which is also fixed to the pin 66 on the outermost part of the calipers. The other end of the armature 69 is fixed to the springs 71 which are held by the casing 63. These springs are maintained in the position shown under sufficient tension so that movement of the calipers inwardly will permit the springs to pull the armature 69 further into the solenoid coils 67. By this means the electrical characteristics of the solenoid coils will be caused to vary proportionately to the extension of the calipers. As indicated in the drawing, electrical conductors connected to each coil are combined to form a cable 72. The individual cables 72 are then combined to form a cable 73 which runs upwardly through the shaft of centering device 3 and through casing 1, into the supporting cable 2 to the surface of the earth.

Figure 10:
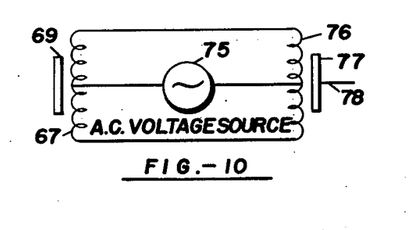
Figure 10 diagrammatically shows a suitable electrical circuit for converting the movements of the calipers of the apparatus of Figures 1 and 2 into electrical energy to permit recording.
Figure 11:
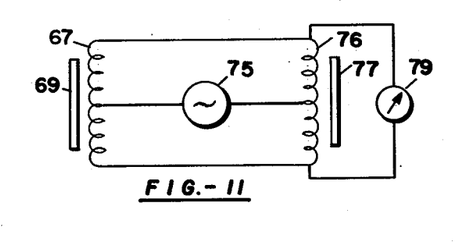
Figures 11 and 12, similarly to Figure 10, show somewhat different circuits for the same purpose, each making it possible to obtain a record of the movement of the calipers of Figures 1 and 2.
Figure 12:
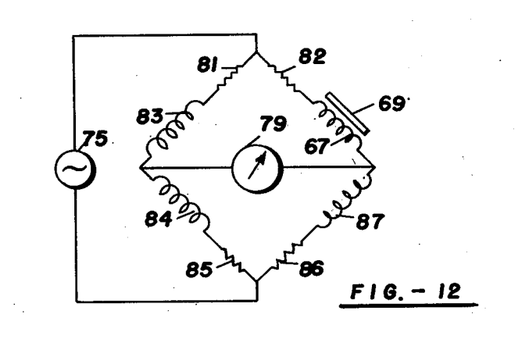

Illustrated in Figures 10, 11, and 12 are suitable electrical circuits for converting the movements of armature 69 in coil 67 into electrical energy which may be recorded to indicate the movement of each caliper along a profile of the bore hole. In these figures, the coil 67 represents the solenoid coil positioned in the apparatus as described, while the numeral 69 designates the armature 69 of this coil. It is to be understood that all other components of these figures are positioned on the surface of the earth, being connected to the coil 69 through the conductors of cables 2, 73, and 72.

In Figure 10 an inductance coil 76 is connected in parallel with the coil 67. An A. C. voltage source 75 is connected to center taps of each coil. Associated with the coil 76 is a slidable armature 77. Due to the electrical characteristics of this circuit, movement of armature 69 of coil 67, forced by the calipers, will cause an equivalent movement of the slidable armature 77. Consequently, the movements of armature 77 may readily be used to plot a record corresponding to the movements of the caliper with which the armature 77 is associated. For example, an inking pen 78 may be provided in or fixed to the armature 77 so as to draw a line on a record paper showing the profile traced by each caliper. Again, if desired, a perforation may be placed in the armature 77 permitting light to pass through the perforation to produce a record on a sensitized paper recorder.

The electrical circuit of Figure 11 is similar to Figure 10. However, in this circuit the armature 77 of coil 76 is fixed or stationary. Therefore, by connecting a galvanometer 79 across the coil 76, the galvanometer will be caused to oscillate as the armature 69 is moved inwardly and outwardly of coil 67. By placing a mirror on the moving coil of the galvanometer, together with a suitably placed and focused light source and sensitized paper recorder, a record of the movements of the galvanometer will be obtained. As galvanometer recorders of this type are well known to the art, a full description of such a recorder will not be made.

In Figure 12, a conventional bridge circuit is illustrated for measuring the variation of the inductance of coil 67 as the position of the armature 69 is varied. In this figure, the four armed bridge corresponds essentially to a Wheatstone bridge resistance circuit. One arm of the bridge contains the coil 67, the inductance of which is to be measured, and the resistance 82 while the other arms contain resistances 81, 85, and 86 and inductance coils 83, 84 and 87. By connecting a recording galvanometer 79 across the bridge, the fluctuations of the galvanometer will follow the movements of armature 69 and hence of the caliper to which the armature is attached.

As the use of circuits such as those of Figures 10, 11, and 12 are fully known and appreciated generally, they will not be described in further detail. However, one further method of converting the movement of armature 69 in coil 67 into recordable electrical energy is deserving of mention. By this method, the principle is used that the resistance of a conductor consisting of a metal such as bismuth will vary as the magnetic field varies in which the conductor is placed. Thus, by employing a bismuth coil for solenoid 67 and by using a permanent magnet rod for armature 69, varying the position of the magnet in the coil responsive to caliper movements will vary the resistance of the coil. In this case by impressing a D. C. voltage on the coil and by connecting a recording galvanometer in the circuit, a record of the movement of the calipers will again be obtained. It is generally desirable to compensate the temperature sensitivity of the bismuth coil by also placing a negative resistance temperature element in the circuit.

Figures 3, 13:
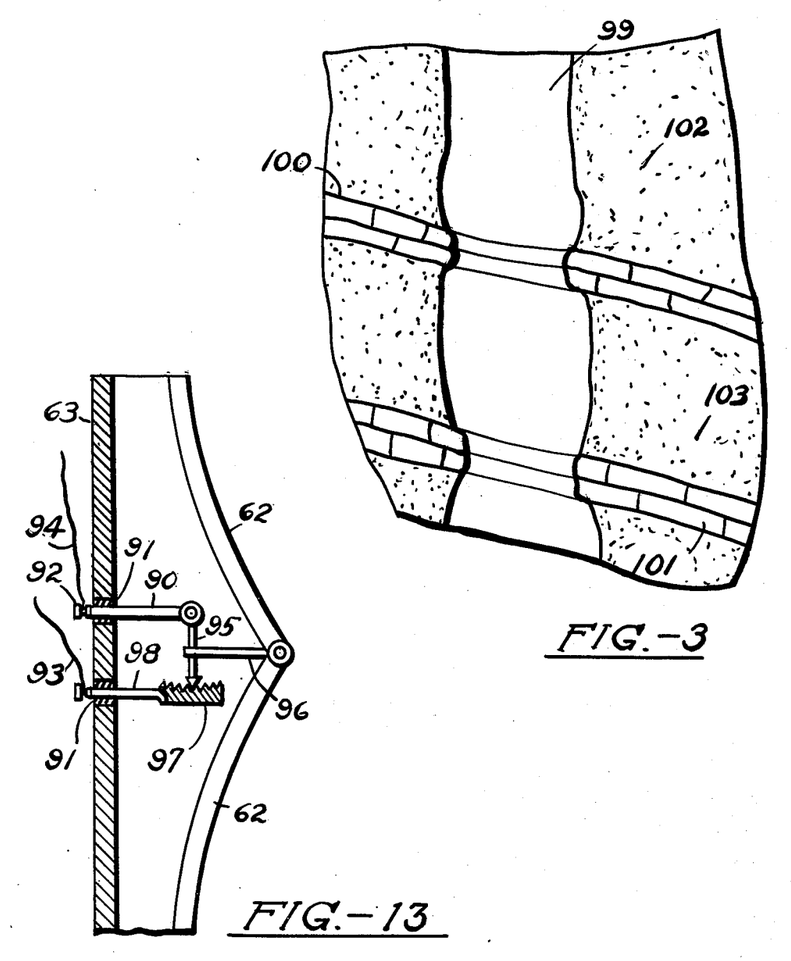
Figure 3 shows the general configuration of strata adjacent a bore hole down which the apparatus is to be lowered.
Figure 13 in a fragmentary diagrammatic view shows a modification of the caliper arrangement of Figures 1 and 2, providing a different means for converting the movements of the calipers into electrical energy.

As described in connection with Figures 1 and 2, there are many ways of suitably utilizing the changes in the electrical characteristics of coil 67 to obtain a record of the movements of the calipers. However, the scope of this invention is not to be limited to the use of a coil in conjunction with the calipers. For example, in Figure 13 is illustrated another manner of obtaining a record of the movements of the calipers. In this fragmentary view of the calipers and case 63 which supports the calipers, the variable inductance coil 67 is replaced by the variable resistance 97. This resistance 97 is suitably supported on the casing 63 by the rod 98 which is insulated from the casing by insulation 91. This rod may be provided with a terminal to which conductor 93 is connected. The contact 95 of the resistor 97 is supported and pivoted by rod 90 so that the contact can move along the resistor 97. Rod 90 is fixed to the casing 63 through insulation 91 to connect to conductor 94. The movements of contact 95 are controlled by the non-conductive rod 96 which is coupled to the caliper. Thus, movements of the caliper cause contact 95 to move along resistor 97 varying the resistance across the conductors 93 and 94. By placing a battery and a recording galvanometer in a circuit with conductors 93 and 94, a record may be obtained of the movements of the calipers. While not shown in Figure 13 it is preferable to position a liquid tight housing around the resistance 97 and contact 95. This may readily be done by providing a packed opening in the housing for the rod 96.

As indicated above, therefore, there are numerous methods of converting the movements of the calipers in apparatus embodying this invention into recordable energy. Thus, as indicated, the calipers may vary the inductance of a coil or the resistance of a coil or the calipers may vary the resistance of a non-inductive resistance. Still further expedients which may be used are to employ Selsyn systems, hydraulic follower systems, or piezoelectric apparatus. It is clear, therefore, that this invention is not to be limited to any particular method for obtaining a record of the caliper movements.

Having now fully described the manner of supporting and positioning suitable devices for obtaining profiles of the bore hole, the way in which this can be used to determine the dip and strike of strata adjacent the bore hole may be appreciated.

Illustrated in Figure 3 is a typical cross section of a bore hole 99 showing the variation of the profile of the hole due to strata of different hardness. Thus since strata 100 and 101 are harder than strata 102 and 103, these strata cause a reduced cross section of the bore hole. Furthermore different strata may have some degree of hardness, but will slough off at different rates due to different characteristics, thus resulting in different cross sections of bore hole. At the intersection of the bore hole and the particular hard stratum therefore, a projection exists relative to the adjacent softer strata. Due to the incline of the strata, these projections are not in the same horizontal plane. Consequently, if the caliper device described is lowered down this bore hole, the calipers will not simultaneously strike the hard strata 100 or 101 but will strike the strata in a sequence dependent on the incline of the strata. As this sequence may be determined from the records of the caliper movements, the incline of the strata may readily be obtained relative to the calipers or the case supporting the calipers. However, two further complications must be met to determine from this the dip and strike of the strata. First it is necessary to determine the orientation of each caliper with respect to the directions of the compass, and secondly it is necessary to determine the inclination of the apparatus supporting the calipers. It is necessary to obtain the orientation of the calipers since there is probably no way of practically lowering the apparatus down a bore hole in a fixed orientation. While the centering devices described minimize rotation of the apparatus, nevertheless, irregularities in the bore hole and torsional forces due to the unrolling of the supporting cable at the surface of the earth do cause periodic or continued rotation of the apparatus. It is also necessary to determine the inclination of the apparatus since there is probably no way of practically maintaining suitable apparatus in a truly vertical position. Thus in the embodiment described, as the apparatus is aligned with the borehole, any departure of the borehole from vertical will incline the apparatus. As boreholes are often notoriously non-vertical it is apparent that a suitable inclination detector is a critical part of this invention. These two remaining components of this invention, the inclination detector and the orientation detector are indicated generally by numerals 104 and 105 of Figure 1 and will now be described in detail.

A suitable form of inclination detector is indicated in Figures 4, 5, 6, and 7. Referring now to these figures, it will be seen that mounted within a casing 11, which in turn is mounted in the case 1 of Figure 1 is a circular shutter 12, arranged for rotation in the casing 11 with the plane of the shutter at right angles to the longitudinal axis of the casing. A suitable means for supporting the shutter for rotary motion is a ring shaped track 13 secured to the casing 11 at its periphery and provided with ball bearings 14. A downwardly extending circular ledge 15 secured to the underside of the shutter completes the supporting means. A ring gear 16 is secured to the periphery of the shutter and arranged to rotate the shutter actuated by a motor 17 having a vertically extending shaft 18 provided with a gear 19 arranged to cooperate with the ring gear of the shutter so as to rotate the shutter at a constant speed.

Figure 4:
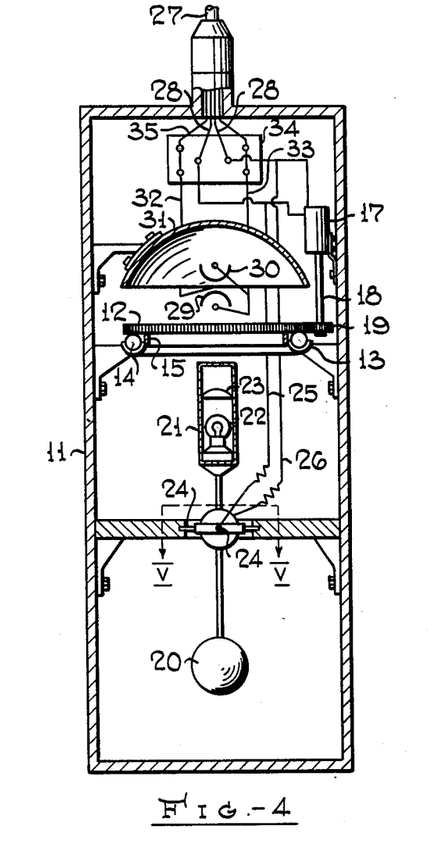

Mounted in the casing below the shutter is a pendulum mounted for free motion in all directions. Attached to the upper extension of the pendulum is an optical tube 21 in which is arranged a light source such as a globe 22 and a lens 23. The light source, lens, and optical tube, are arranged to produce a beam of light having rays parallel to the longitudinal axis of casing 11 and the casing 1 when the casings are perpendicular. From the above description it will be apparent that when the casing is perpendicular the beam of light from the optical tube will impinge on the center of shutter 12.

Figure 5:
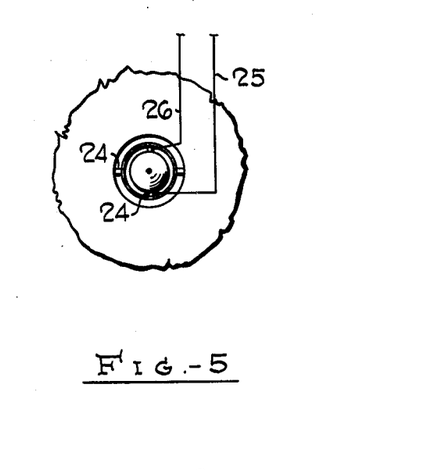
Figure 5 being a view taken along the line V—V of Figure 4.

In the embodiment illustrated in Figures 4 and 5, the pendulum 20 is mounted on gimbals 24 and power for operating lamp 22 is transmitted thereto through the gimbal ring by means of conductors 25 and commutators 26 as appears in the drawing. A cable 27 is provided extending from cable 2 of Figure 1 to transmit power down through the cable, through conductors 28, for operating both motor 17 and lamp 22.

Mounted in casing 11 in the upper end thereof, above shutter 12, is a light sensitive means. A satisfactory arrangement is that shown in the drawing comprising a pair of photocells 29 and 30 together with a concave mirror 31 mounted above the photocells. It will be evident that the arrangement of photocells and the mirror is such that any light transmitted from lamp 22 through shutter 12 will be effective to actuate either photocell 29 or photocell 30. The signal received by the pair of photocells 29 and 30 is transmitted through conductors 32 and 33 to the amplifier diagrammatically indicated by rectangle 34. The amplified signal is then transmitted through the insulated conductors 35 contained within cable 27 and cable 2 to a recording galvanometer, not shown, arranged at the surface of the earth.

Figure 7:
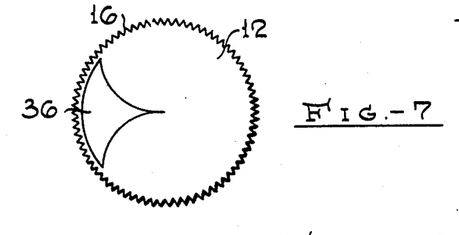
Figure 7 showing a top view of the shutter with which the device of Figure 4 is provided.

A top view of a suitable shutter for the device is shown in Figure 7. A portion 36 is removed from the shutter so that when the axis of casing 11 is vertical little or no light will be passed by shutter 12 from source 22 to photocells 29 and 30. However, upon deviation of casing 11 from the vertical, light will be transmitted from the lamp to the photocells with each rotation of the shutter. The opening 36 in the shutter is so arranged that with increasing displacement of the axis of casing 11 from the vertical, there is a progressively increased time of exposure of the photocells to light from the lamp. In other words, when the casing 11 deviates from the vertical a pulse is transmitted by the photocells with each revolution of the shutter, the duration of the pulses being a function of the deviation of the casing from the vertical. By calibrating the pulse length with respect to inclination, the exact inclination can be determined.

Figure 6:
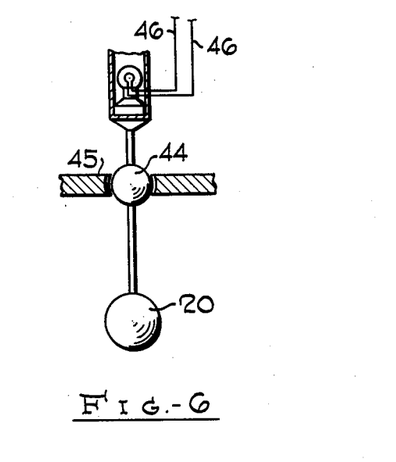
Figure 6 being a fragmentary view showing an alternative method for mounting the pendulum of the device.

A modification of the means for suspending the pendulum is illustrated in Figure 6. In this embodiment a ball 44 is attached to the pendulum and a member 45 adapted to be secured to the casing defines a suitable socket to cooperate with the ball. In this embodiment leadwires 46 connect lamp 22 to the source of power. The leadwires are of ample length to allow the pendulum to move freely in all directions. The remainder of the apparatus according to this modification may be the same as in Figure 4 and accordingly is not again illustrated. The type of record produced by the inclinometer and the interpretation of this record will be discussed hereinafter in connection with Figure 14 of the drawings.

Figure 8:
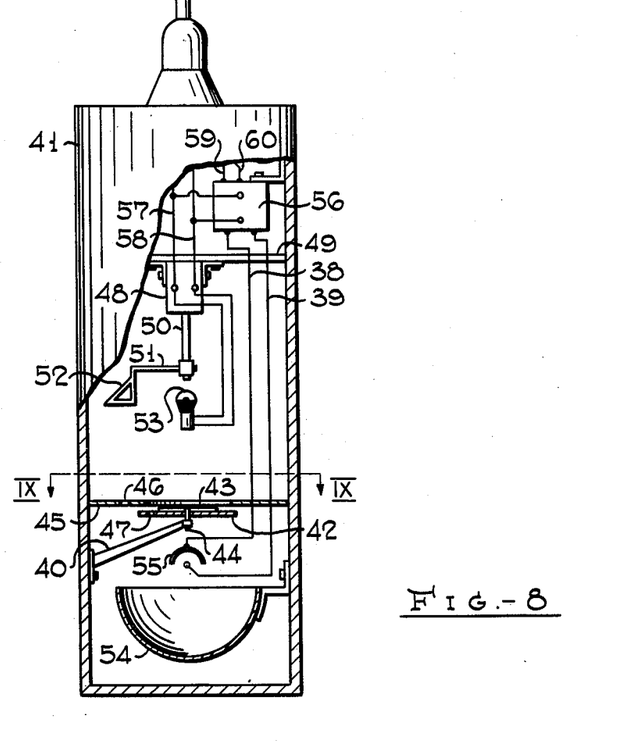
Figures 8 and 9 illustrate a suitable orientation device for use in the apparatus of Figures 1 and 2, Figure 8 being an elevation partly in section of the device, and Figure 9 being a view of Figure 8 along the line IX—IX.
Figure 9:
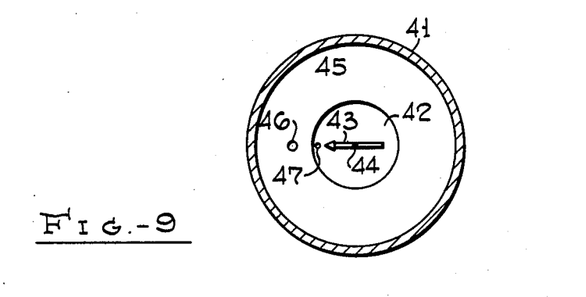

Referring now specifically to Figures 8 and 9, a suitable orientation detector to be contained in casing 1 of Figure 1 is indicated. The detector has a shell or case 41, of a non-magnetic material such as brass, having mounted therein a circular member 42, to which is attached bar magnet 43. A pivot 44 extends through member 42 and is supported by a suitable bracket 40. An annulus 45 has its periphery secured to case 41 and is arranged so that the circle defined by its inner circumference is slightly above and inside of the periphery of member 42. Member 45 is provided with an opening 46 and member 42 is provided with a similar but smaller opening 47. Opening 46 is preferably in line with pivot point 44 and one of the calipers. It will be apparent that the arrangement just described is generally similar to a marine compass, with opening 46 corresponding to the lubber's line on such a compass, and opening 47 corresponding to the north point of the compass.

Some distance above member 42 a motor 48 is secured to bracket 49, with shaft 50 of the motor aligned with the pivot 44 of member 42. A laterally-extending member 51 is secured to shaft 50, and carried thereby is prism 52. A source of light 53 is stationarily arranged adjacent prism 52, so that with each rotation of the prism a light from source 52 will be transmitted through openings 46 and 47. As will be seen, it is necessary to synchronize the rotation of the prism 52 with the rotation of the shutter 12 of the inclination detector. This may be done by using constant speed motors for both detectors adapted to rotate the shutter and prism at the same speed. Alternatively a single constant speed motor may be employed for driving both the shutter and the prism. In this case it is convenient to position the motor in the case of the orienting device, employing suitable gearing in connection with a shaft extending upwardly into the inclination detector to drive the ring gear of the shutter at the same rotational speed as the prism. In any case it is necessary to synchronize the rotation of the shutter and the prism of the two detectors; and preferably in such a way that the medium point of the cut away portion of the shutter lies in a plane passing through the prism and the center of rotation of the prism. By this means it is possible to correlate the degree of inclination with the orientation of the apparatus so as to tell the direction of incline as will be apparent further on in this description.

Below members 42 and 45 is fixed a suitably curved mirror 54. This mirror serves to reflect light transmitted through openings 46 and 47 to a centrally arranged light sensitive device 55. As a suitable light sensitive device a photoelectric cell 55 may be employed and is diagrammatically illustrated in the drawing, with the cell feeding to the amplifier diagrammatically indicated by rectangle 56 by means of conductors 38 and 39.

Electrical conductors 57 and 58 are arranged for supplying power to amplifier 56, motor 48, and light source 53. In addition the signal from amplifier 56 may be transmitted to the surface through conductors 59 and 60 passing through cable 2. It will be understood that conductors 59 and 60 may be connected to a conventional recording galvanometer arranged at the surface of the earth. The nature of the record produced by the orientation device will be hereinafter described in connection with Figure 14.

In determining orientation by means of this device, power is supplied to constant speed motor 48, which in turn rotates prism 52 at a constant rate. Every time prism 52 passes above opening 46 a ray of light will be passed through this opening and will be reflected to light-sensitive means 55. In like manner the passage of prism 52 above opening 47 will cause a ray of light to be momentarily transmitted to the light-sensitive source 55. When openings 46 and 47 lie on a common radius, the light from source 53 will be transmitted through openings 46 and 47 simultaneously, but any angular movement of member 42, with respect to casing 41, will cause a separation of openings 46 and 47, with a resulting interval between the time the light passes through opening 46 and through opening 47. In other words, if the openings 46 and 47 are arranged so that the light will pass through the two openings simultaneously when magnet 43 points to the magnetic north, any deviation of the case 41 from this orientation will be indicated by the angular separation of openings 46 and 47. It will be apparent that due to the nature of the orientation detector the case 1 and the associated inclination detector should preferably be composed of non-magnetic material. Similarly the cables passing through case 1 should be shielded cables.

The nature of a suitable embodiment of this invention having now been fully described, the record and the interpretation of the record produced by the integral apparatus may now be considered.

Figure 14:
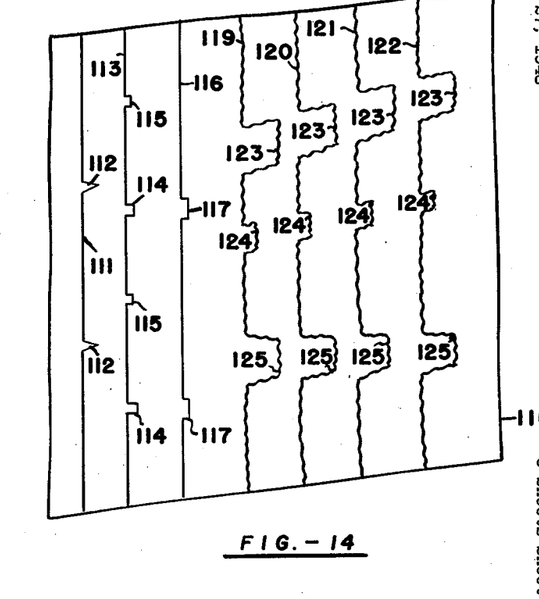
Figure 14 shows the type of record obtained, indicating the relative hardness, the dip, and the strike of strata traversing a bore hole down which the apparatus is lowered.

Illustrated in Figure 14 is diagrammatically indicated a typical record obtainable with the well logger of this invention. The record shown may be produced on a strip of photographic film 110 showing the fluctuations of galvanometers controlled by the calipers, orientation detector, and inclination detector. In addition to these records, a record should be made of the depth of the apparatus in the borehole. Suitable devices for indicating the depth of a cable suspended tool are well known to the art and so will not be described. The markings produced by a suitable depth indicator are represented by line 111 of Figure 14. The notches 112 of this line periodically appear to indicate distances on the record paper corresponding to a given distance in the well. For example a notch 112 will appear each ten feet the apparatus is lowered.

The line 113 on this record represents the type of record produced by the orientation detector described. The passage of light through the opening 46 of the detector is shown by the "kicks" designated by numeral 114. Similarly the passage of light through the opening 47 is shown by kicks 115. Since the larger opening 46 allows a greater amount of light to pass than opening 47, the kick produced by passage of light through opening 46 may readily be distinguished. It will be recalled that if the kicks 114 and 115 coincided, it would indicate that opening 46 was directly north of the center of the apparatus. However, since the kicks 114 fall approximately midway between the kicks 115, it is apparent opening 46 is almost due south of the center of the case. An actual record of course can be accurately examined to obtain the bearing precisely. Assuming, as stated to be preferred, that one of the four caliper arms is aligned with the opening 46 and the center of the case, the exact orientation of this caliper is now known. Similarly the position of each of the other calipers is also known. For example if the four calipers are symmetrically placed around their supporting case, then it will be known that one caliper, as indicated above, is pointed due south and that the other calipers are pointed east, north, and west.

The record produced by the inclination detector is indicated by line 116 of Figure 14. As formerly indicated, the length of the pulse 117 indicates the degree of inclination. Thus the fairly long pulse 117 indicates an inclination of approximately 10 degrees. As the rotation of the shutter producing the pulse is synchronized with the rotation of the prism in the orientation device, the occurrence of the pulse 117 at the same time as the kick 114 due to light passage through opening 46 indicates the apparatus is inclined in a plane passing through opening 46. As opening 46 was found to bear due south of the center of the apparatus, the apparatus is positioned so that the intersection of the center line of the apparatus, at the bottom of the apparatus establishes an angle of 10 degrees with a vertical reference line, the plane established by these lines being due north and south. Thus the direction of incline of the apparatus may readily be found by extending the median point of pulse 117 to line 113 from which the direction of inclination can be read. It must be understood, however, that this procedure is only valid if the preferred procedure was employed of causing the median cutaway portion of the inclinometer to rotate in a plane passing through the prism and the center of rotation of the prism of the orientation detector. If not, so long as both shutter and prism rotate at the same rotational speed, the relation of the time of pulse 117 and the pulse 114 may be determined just prior to lowering the apparatus into the ground, after the constant speed motors have been started. In other words so long as the constant speed motors of the inclinometer and orientation device are rotating at the same speed, there will be a fixed angular relationship between the shutter of the inclinometer and the prism of the orientation device. In the preferred procedure the angular relationship is zero, the shutter and prism rotating together. Consequently in this case the direction of orientation will be the direction of orientation of the opening 46 of the orientation device plus the number of degrees beyond which the median point of pulse 117 appears. This may readily be obtained from the record of Figure 14. Alternatively either before or after the apparatus is placed in the borehole, it may be inclined in a particular direction, for example north, to obtain the angular relationship between the prism and shutter. In this case the direction of inclination will be equal to the orientation of opening 46 at any instant plus the angular relationship between the prism and shutter plus the number of degrees beyond this point at which the median point of pulse 117 appears. These points may readily be determined by dividing lines 113 and 116 into degrees. This can be done by noting that the distance between pulses 114 will be equal to 360°.

Having now established from the record of Figure 14, the depth of the apparatus, the orientation of the calipers, and the inclination of the apparatus, it remains only to interpret the records of the calipers indicated by lines 119, 120, 121, and 122. These lines represent a profile of the borehole traced by each of the four calipers. If it be considered that the calipers are numbered 1, 2, 3 and 4 around the case, then line 119 may represent the record of caliper 1, line 120 that of caliper 2, line 121 that of caliper 4, and line 122 that of caliper 3. It will be noted on the record that three strata are indicated by the calipers. Due to the sequence in which the calipers touched the strata, it appears the uppermost stratum indicated by traces 123 is sharply inclined from caliper 3 down to caliper 1. The stratum indicated by traces 124 is inclined in the same direction but not as steeply, while the stratum indicated by traces 125 is in the same plane as the four calipers. It must be remembered of course that the inclination of the case must be accounted for in determining the actual incline of each stratum. Thus the stratum indicated by traces 125 is not horizontal but lies in the plane through the calipers determined by the inclination of the apparatus as formerly found.

In accurately determining the dip and strike of strata from a record such as that shown, the following principles may be employed. It is generally most convenient to first neglect the inclination of the apparatus and to find the incline of each stratum assuming the apparatus is vertical. When this has been done, by rotating the established plane in accordance with the inclination of the apparatus, the actual orientation of the particular stratum may be found. In carrying this out, the vertical distance between contact of each caliper with a particular stratum may be found by referring to the depth markings shown by the first line on the record. The distance of each caliper from the center of the case may be found provided the record has been calibrated to show this. Thus vertical reference lines may be drawn on the record adjacent to the actual line drawn by each caliper to show the actual extension of the caliper. By also knowing the orientation of each caliper as formerly described, the position of the caliper may be computed. As the procedure used is simply mathematical geometric analysis, the procedure will not be further described.

It may be noted, however, that a very convenient manner of determining the orientation of each stratum is to employ a suitable model. The model may consist of two planes having adjustable elevations. The lower plane may be elevated to an inclination representing the plane in which the caliper arms lie as dictated by the inclination of the apparatus. The upper plane may then be elevated proportional to the vertical difference in height between contact of the calipers with the particular stratum, having the supporting points of the plane separated just as the calipers are. This will then establish the upper plane in the exact orientation of the actual stratum permitting measurements of the dip and strike of the stratum from this model.

As described, therefore, the present invention comprises the method and apparatus for obtaining the dip and strike of strata adjacent a borehole. The procedure entails lowering a properly centered and aligned measuring device down a borehole, having means for obtaining at least three profiles of the borehole and for obtaining the azimuthal orientation and the inclination of the apparatus while profiling. The apparatus employed preferably comprises four caliper profiling means arranged between two centering and aligning means. Any suitable type of orientation and inclination detectors may be employed.

The information thus obtained enables determination of the exact path or orientation of the borehole in the earth, the relative hardness of strata adjacent the borehole, and the dip and strike of strata adjacent the borehole. All of this information may be obtained with a high degree of precision by means of the method and apparatus described.

As the present invention is capable of many embodiments, modifications, and substitution of equivalents it is to be understood the appended claims should be given a broad interpretation commensurate with the true contribution to the art.

I claim:

1. Well logging apparatus comprising, in combination, a body adapted to be lowered into a bore hole, at least three profiling arms movably held by said body and equally spaced circumferentially about said body, means urging each of said profiling arms independently outwardly from said body, means adapted to measure the independent movement of each of said profiling arms relative to said body, a first centering means positioned on said body above said profiling arms, a second centering means positioned on said body below said profiling arms, said first and second centering means acting to center said body in the bore hole and to align the body with the bore hole, azimuthal orientation means and inclination measuring means positioned in said body, and recording means associated with said profiling arms, said azimuthal orientation means and said inclination measuring means to record simultaneously indicia representative of the independent movement of each of said arms, the azimuthal orientation of a selected point on the body and the inclination of the body from the vertical.

2. Apparatus according to claim 1 in which said body is provided with circumferentially spaced vertical slots, and in which each of said profiling arms comprises two arcuate arm segments, with their convex sides adjacent said body, a pin pivotally attaching said segments together at their outer ends, and second pins attached to the inner ends of each segment and slidably fitted within said vertical slots.

3. Apparatus according to claim 1 in which the means adapted to measure the independent movement of each of the profiling arms relative to the body includes a coil held by said body and an armature associated with the profiling arm whereby motion of the arm causes movement of the armature relative to the coil.

4. Apparatus according to claim 1 in which the means adapted to measure the independent movement of each of the profiling arms relative to the body includes an electrical resistance associated with the profiling arm whose resistance varies with motion of the arm.

5. Apparatus according to claim 1 in which said first centering means and said second centering means comprise shaft members extending upwardly and downwardly, respectively, from said body member longitudinally thereof, a pair of collar members positioned around each shaft member, at least one collar member on each shaft member being arranged for limited slidable movement lengthwise of said shaft member, a first plurality of leaf spring elements circumferentially spaced about one of said shaft members and attached at each end to one pair of collar members positioned on said shaft, and a second plurality of leaf spring elements circumferentially spaced about the other of said shaft members and attached at each end to the second pair of collar members.

6. Apparatus according to claim 1 in which said orientation apparatus comprises a magnetic compass element, a circular light mask rotatable with said magnetic compass element and provided with a perforation having a fixed relation to said compass element, a second light mask fixed with respect to said body, arranged in a plane parallel to the plane of said first light mask and provided with a central aperture capable of admitting light to said aperture in said first mask and with a reference aperture outside the area of said first mask, a light source mounted for rotational movement in a plane parallel to the planes of said light masks, a photocell positioned on the other side of said masks from said light source in the path of light rays passing through said aperture, said inclination measuring means comprising a pendulum, a beamed light source associated with said pendulum, a second photocell arranged to receive light from said light source and a third circular rotatable mask arranged between said light source and said second photocell, said last named mask having an aperture from the center of the circle to its periphery larger than a segment of the circle, and including means to rotate said last named mask and said orientation device light source in synchronism at a constant rotary speed.

7. Well logging apparatus comprising in combination a body adapted to be lowered into a bore hole, at least three profiling arms movably held by said body and equally spaced circumferentially about said body, means urging each of said profiling arms independently outwardly from said body, means adapted to measure the independent movement of each of said profiling arms relative to said body, a first centering means and a second centering means positioned on said body in spaced relation along said body whereby said first and second centering means act to center said body in the borehole and to align the body with the borehole, orienting means associated with said profiling means adapted to determine the orientation of the profiling means, and recording means associated with the said profiling means and the said orienting means adapted to record the said profiles and the said orientation determinations.

8. Well logging apparatus comprising in combination: a body adapted to be lowered into a borehole, at least three profiling arms movably held by said body and equally spaced circumferentially about said body, means urging each of said profiling arms independently outwardly from said body, means adapted to measure the extent of the independent movement of each of said profiling arms relative to said body, recording means associated with said profiling arms adapted to record indicia representative of the extent of independent movement of each of said arms and first and second centering means positioned on said body in spaced relation along the length of the body whereby said centering means act to center said body in the borehole and to align the body with the borehole.

FRANK G. BOUCHER.

References Cited in the file of this patent

UNITED STATES PATENTS

| Number | Name | Date |
| --- | --- | --- |
| 1,339,955 | Hardel | May 11, 1920 |
| 1,911,997 | Gillespie | May 30, 1933 |
| 1,980,100 | Schlumberger | Nov. 6, 1934 |
| 2,030,244 | Cox | Feb. 11, 1936 |
| 2,142,465 | Von Graf | Jan. 3, 1939 |
| 2,170,527 | Culbertson | Aug. 22, 1939 |
| 2,176,169 | Doll | Oct. 17, 1939 |
| 2,190,950 | Potapenko | Feb. 20, 1940 |
| 2,235,533 | Roberts | Mar. 18, 1941 |
| 2,267,110 | Kinley | Dec. 23, 1941 |
| 2,281,960 | Vacquier | May 5, 1942 |
| 2,322,343 | Brandon | June 22, 1943 |
| 2,322,634 | Howell et al. | June 22, 1943 |
| 2,332,777 | Boucher | Oct. 26, 1943 |
| 2,340,987 | Robidoux | Feb. 8, 1944 |
| 2,365,999 | Boucher | Dec. 26, 1944 |
| 2,396,935 | Walstrom | Mar. 19, 1946 |
| 2,398,562 | Russell | Apr. 16, 1946 |
| 2,415,636 | Johnson | Feb. 11, 1947 |
| 2,427,950 | Doll | Sept. 23, 1947 |
| 2,444,265 | Ostheimer | June 29, 1948 |

FOREIGN PATENTS

| Number | Country | Date |
| --- | --- | --- |
| 4,190 | Austria | 1901 |